(12) United States Patent
Patro et al.

(10) Patent No.: US 12,342,272 B2
(45) Date of Patent: Jun. 24, 2025

(54) TRANSPORT SLICE ACTIVATION AND DEACTIVATION CONTROL PROTOCOL

(71) Applicant: Nokia Solutions and Networks Oy, Espoo (FI)

(72) Inventors: Samir Kumar Patro, Bangalore (IN); D Laskshmi Narayana, Bangalore (IN); Manohar SL, Bengaluru (IN); Shreyansh Gang, Jodhpur (IN); Mohammad Shahid, Mau (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 489 days.

(21) Appl. No.: 17/937,108

(22) Filed: Sep. 30, 2022

(65) Prior Publication Data
US 2024/0114443 A1 Apr. 4, 2024

(51) Int. Cl.
*H04W 48/18* (2009.01)
*H04W 80/06* (2009.01)

(52) U.S. Cl.
CPC ............ *H04W 48/18* (2013.01); *H04W 80/06* (2013.01)

(58) Field of Classification Search
CPC .............................. H04W 48/18; H04W 80/06
See application file for complete search history.

(56) References Cited

U.S. PATENT DOCUMENTS

| | | | |
|---|---|---|---|
| 11,026,165 B2 | 6/2021 | Forsman | |
| 2019/0223055 A1* | 7/2019 | Bor Yaliniz | ........ H04L 41/0897 |
| 2021/0044482 A1* | 2/2021 | Katsalis | .............. H04L 41/0806 |
| 2021/0185601 A1 | 6/2021 | Altay | |
| 2022/0007439 A1 | 1/2022 | Ravi | |

FOREIGN PATENT DOCUMENTS

WO 2020/168457 A1 8/2020

OTHER PUBLICATIONS

B. Wu et al., "A Yang Data Model for Transport Slice NBI draft-wd-teas-transport-slice-yang-02", Network Working Group Internet Draft, Jul. 12, 2020.
Lin Meng et al., "E2E Network Slicing Use Case Overview", Open Network Automation Platform, Dec. 8, 2020.
Hesam Rahimi et al., "PTL Review for Transport Slicing Impacts on SDN-C for Guilin Release", Open Network Automation Platform.
(Continued)

*Primary Examiner* — Wayne H Cai
(74) *Attorney, Agent, or Firm* — Kramer & Amado, P.C.

(57) ABSTRACT

Various embodiments relate to a transport slice controller, including: at least one processor; and at least one memory storing instructions, that when executed by the at least one processor, cause the apparatus at least to: initialize a transport slice activation and deactivation protocol (TS-ADCP) session for a transport slice of a telecommunications network; determine an indication of the login status of users of the transport slice, wherein the login status includes an indication that a first user has logged in to the transport slice or that a last user has logged out of the transport slice; and sending a message with the indication of the login status of users to a network element to indicate that the transport slice should be activated or deactivated.

15 Claims, 6 Drawing Sheets

(56) References Cited

OTHER PUBLICATIONS

T. Saad et al., "Realizing Network Slices in IP/MPLS Networks draft-bestbar-teas-ns-packet-04", TEAS Working Group Internet-Draft, Oct. 22, 2021.
"Information Technology—Systems Management: State Management Function; x.731 (Jan. 1992)", ITU-T—Standard in Force (I), International Telecommunication Union, Geneva, CH, No. x.731 (Jan. 1092), Jan. 17, 1992, XP017404167, pp. 7-8.
Extended European Search Report issued for EP Patent Application No. 23193541.2 dated Feb. 23, 2024.

\* cited by examiner

TRANSPORT SLICE ACTIVATION AND DEACTIVATION CONTROL PROTOCOL

TECHNICAL FIELD

Example embodiments disclosed herein relate to a transport slice (TS) activation and deactivation control protocol.

BACKGROUND

In 5G networks transport slices (TS) may be used to provide dedicated network connectivity for a specific user application or function. The TS provides a specified quality of service (QoS) to the user. The TS may be implemented as dedicated tunnel for the user. The TS may have portions that include a radio access network (RAN) slice, a transport slice, and core slice.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a transport slice controller, including: at least one processor; and at least one memory storing instructions, that when executed by the at least one processor, cause the apparatus at least to: initialize a transport slice activation and deactivation protocol (TS-ADCP) session for a transport slice of a telecommunications network; determine an indication of the login status of users of the transport slice, wherein the login status includes an indication that a first user has logged in to the transport slice or that a last user has logged out of the transport slice; and sending a message with the indication of the login status of users to a network element to indicate that the transport slice should be activated or deactivated.

Various embodiments are described, wherein sending a message with the indication of the login status of users to a network element includes sending a control plane message to a network slice subnet management function.

Various embodiments are described, wherein the network element is a cell site router.

Various embodiments are described, wherein sending a message with the indication of the login status of users to a network element includes initiating via a radio access network a data plane message to the network element.

Various embodiments are described, wherein sending a message with the indication of the login status of users is a single bit and wherein the message includes a slice service type field and a slice differentiator field.

Further various embodiments relate to a radio access network, including: at least one processor; and at least one memory storing instructions, that when executed by the at least one processor, cause the apparatus at least to: receive an indication of the login status of users of a transport slice of a telecommunications network, wherein the login status includes an indication that a first user has logged in to the transport slice or that a last user has logged out of the transport slice; and sending a message with the indication of the login status of users to a network element to indicate that the transport slice should be activated or deactivated.

Various embodiments are described, wherein sending a message with the indication of the login status of users to a network element includes sending a control plane message to a network slice subnet management function.

Various embodiments are described, wherein the network element is a cell site router.

Various embodiments are described, wherein sending a message with the indication of the login status of users to a network element includes sending a data plane message to the network element.

Various embodiments are described, wherein sending a message with the indication of the login status of users is a single bit and wherein the message includes a slice service type field and a slice differentiator field.

Further various embodiments relate to a network element, including: at least one processor; and at least one memory storing instructions, that when executed by the at least one processor, cause the apparatus at least to: initialize a transport slice activation and deactivation protocol (TS-ADCP) session in the network element for a transport slice of a telecommunications network; receiving a message with the indication of the login status of users to indicate that the transport slice should be activated or deactivated; and changing the status of the transport slice at the network element based on the message with the indication of the login status of users.

Various embodiments are described, wherein receiving a message with the indication of the login status of users to includes receiving a control plane message.

Various embodiments are described, wherein the network element is a cell site router.

Various embodiments are described, wherein receiving a message with the indication of the login status of users to a network element includes receiving a data plane message.

Various embodiments are described, wherein receiving a message with the indication of the login status of users is single bit and wherein the message includes a slice service type field and a slice differentiator field.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures in the following list.

To facilitate understanding, identical reference numerals have been used to designate elements having substantially the same or similar structure and/or substantially the same or similar function.

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

TS may be used to provide network access for user application and functions. One example application may be for vehicle-to-everything (V2X) applications. A vehicle may need access to various services that require a connection to V2X application servers. Often these V2X applications have stringent QoS requirements in order to meet performance requirements of the application, and these QoS requirements may be driven by safety issues in the case of vehicle applications. Further, a specific vehicle may have to access various V2X applications each with different QoS applications, so separate TSs may be created for each application with its own QoS. Further, these services are only needed when the vehicle is in operation, so the user/provider of the service should only be charged for use of the services when they are required. Currently, the 5G slicing architecture does not have a protocol to facilitate the activation and deactivation of TS so that usage can be measured and charged. Embodiments of such a TS activation and deactivation protocol will be described herein. The configuration for a TS slice pushed to a device or changing of the configuration is static and expensive to make the necessary dynamic changes. Unless the subscription is used, configuration changes are not desirable. On the contrary the reservation of the resources cannot be kept intact between times that the user uses the services. This becomes expensive for the user and/or wastes unused network capability.

One example of the use to TS is for connected vehicles. An vehicle manufactures may provide various applications to the vehicles it manufactures, for example, mapping, entertainment, traffic reports, etc. The manufacturer may set up TSs for each of these services in various geographic areas as vehicles start accessing the services. This will allow the vehicles to have dedicated network access meeting QoS standards associated with the service. Once a vehicle enters a region and requests the service, a TS may be set up and activated to provide the service. The TS may support many vehicles. Then when there is no remaining demand for the services, the TS may be deactivated. This allows for the network resources to be used to purpose other Slices for different Enterprise Customer(s), until needed again. Further, it means that the vehicle manufactures and/or the user of the services is not charged for the TS when it is deactivated. This approach may also be used for other types of services and application such as a streaming service being offered to mobile devices on the network.

Figure 1:
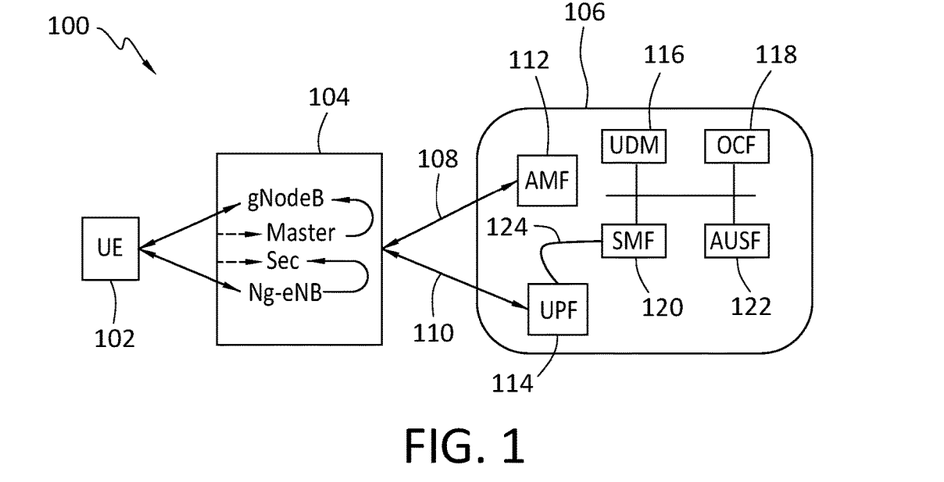
FIG. 1 illustrates a high level diagram of a 5G network.

FIG. 1 illustrates a high level diagram of a 5G network. The 5G network 100 includes a user equipment (UE) 102, radio access network (RAN) 104, and 5G core 106. The RAN 104 may include a next generation e-nodeBs (Ng-eNB) and a gNodeB. The UE 102 may have two connections with the RAN 104 where one connection uses gNodeB and the other connection uses the Ng-nodeB. The RAN 104 may communicate with the 5G core 106 over a N2 interface 108 and a N3 interface 110. The N2 interface 108 supports control plane signaling between RAN 104 and 5G core 106 via the Access and Mobility Management Function (AMF) 112 covering scenarios related to UE 102 context management, protocol data unit (PDU) session/resource management procedures. The N3 interface 110 conveys user data from the RAN to the user plane function (UPF) 114, making it possible to create both low- and high-latency services. The 5G core may also include a unified data management (UDM) 116, policy control function (PCF) 118, session management function (SMF) 120, and authentication server function (AUSF) 122. There may be an N4 interface between the UPF 114 and SMF 120.

Figure 2:
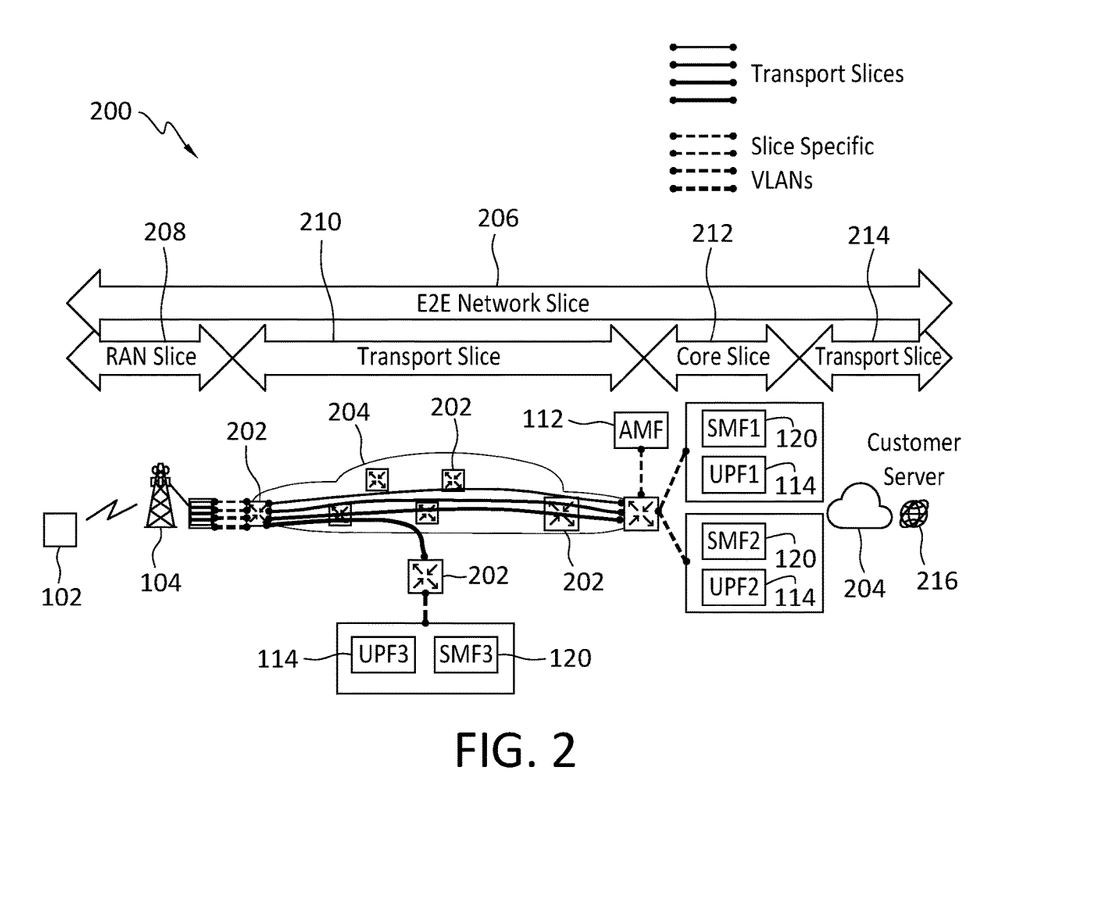
FIG. 2 illustrates how network slicing may be implemented on the 5G network.

FIG. 2 illustrates how network slicing may be implemented on the 5G network. The 5G network 200 includes a UE 102, RAN 104, transport network 204, multiple network elements 202, multiple SMFs 120 and UPFs 114, and customer server 216. An end-to-end network slice 206 is shown where a TS provides communication between the UE 102 and the customer server 216 through the 5G network 200. The end-to-end network slice 206 may be broken up into a RAN slice 208, transport slice 210, core slice 212, and transport slice 214. The RAN slice 208 provides the communication between the UE 102 and RAN 104. The transport slice 210 provides the communication between the RAN 104 and the 5G core. The core slice 212 provides communication in the 5G core. The transport slice 214 provides communication between the 5G core and the customer server 216. Each of these slices receives QoS requirements that will support the overall QoS for the end-to-end TS 206.

In the above 5G network 200, the transport is the domain that in most scenarios are configuration heavy and that takes the traffic across a long haul network before exiting at the RAN/Core Domain. There is currently no protocol available that will release resources but track the usage when the service is enabled and that ensures the stability of the TS including providing the required QoS. On most occasions once the tunnel is configured and resources are allocated, the tunnel remains intact and design needs are not replicated to overlay tunnels. Today a user endpoint classification is not propagated to the transport layer, and the transport layer is not aware of what kind of dynamic changes a software defined network (SDN) should be ready to implement based upon changing and dynamic needs of the applications.

A TS activation and deactivation protocol (TS-ADCP) may be defined as a protocol meant for pausing and resuming on-demand TS services by an TS controller (TSC) with the help of network element resources. It is noted that the TSC maps to the 3FPP defined transport-network slice subnet management function (TS-NSSMF). For TS-ADCP to work it needs topology information and reservation details for each of the network segments.

Figure 3:
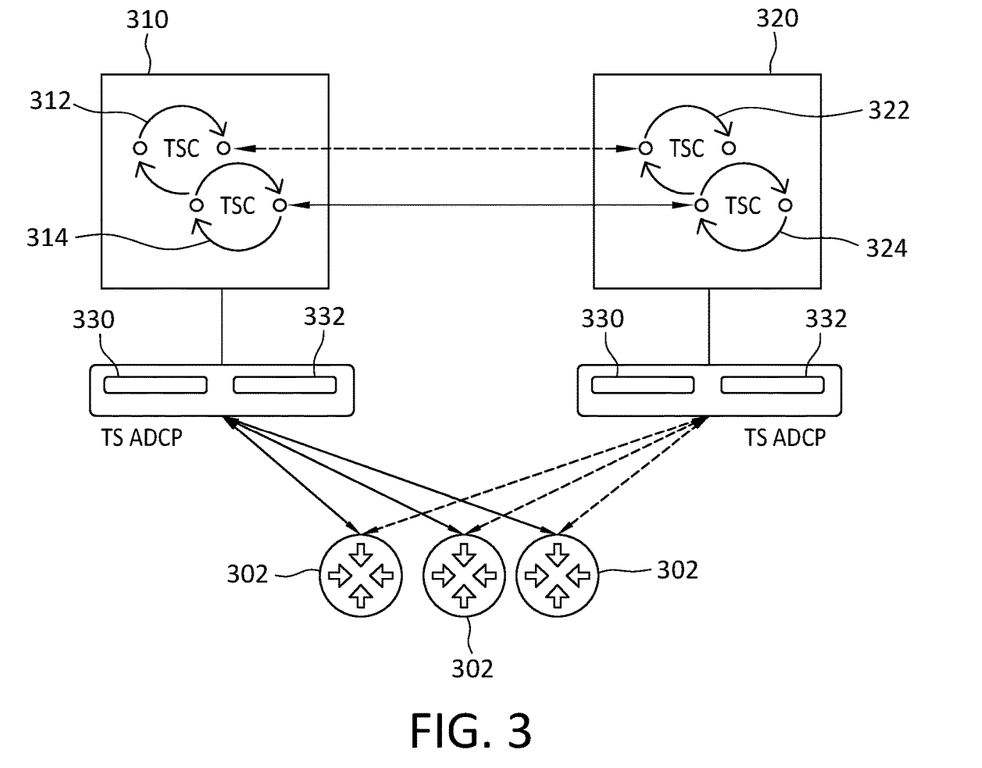
FIG. 3 illustrates the interaction between the TSC and network elements.

FIG. 3 illustrates the interaction between the TSC and network elements. A primary TSC cluster 310 and secondary TSC cluster 320 may be used to control the network using the TS-ADCP to implement TSs. The primary TSC cluster 310 may include TSC 312 and TSC 314. Any number of TSCs may be included in primary TSC cluster 310. The TSC cluster 320 may include TSC 322 and TSC 324. The secondary TSC cluster 320 provides a backup to the primary TSC cluster 310 in case of failure of the primary TSC cluster 310. Any number of TSCs may be included in secondary TSC cluster 320. The primary TSC cluster 310 may provision any number of TSs, for example first TS 330 and second TS 332. The primary TSC cluster 310 receives the notification regarding activation or deactivation of one or more TSs from a UE application. The primary TSC cluster 310 would then use TS-ADCP to communicate the UE Application's request to pause/resume service down to the network elements 302. A TSC in the primary TSC cluster 310 will identify the control plane IP service to determine the state of traffic and determine if there is anything pending to be executed. The corresponding data plane protocol will act on the traffic.

Figure 4:
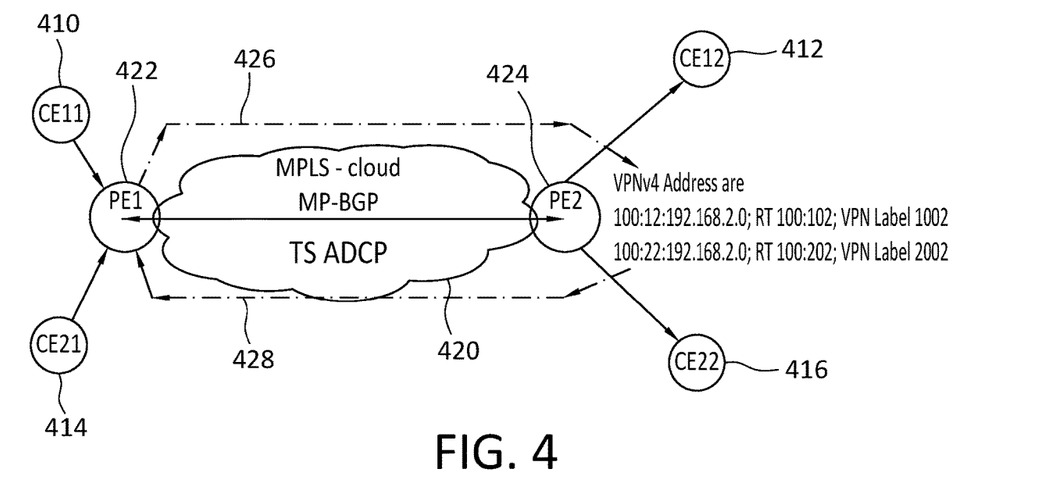
FIG. 4 illustrates an example of tunnelling that may be used to implement transport slices.

FIG. 4 illustrates an example of tunnelling that may be used to implement transport slices. A first provider edge (PE1) 422 is connected to a second provider edge (PE2) 424 via a transport network 420. A first customer edge of a first customer (CE11) 410 and second customer edge of the first customer (CE12) 412 may provide services via a first TS. The CE11 410 communicates with CE12 412 via PE1 422, transport network 420, and PE2 424. Further, a first customer edge of a second customer (CE21) 414 and second customer edge of the second customer (CE22) 416 may provide services via a second TS. The CE21 414 communicates with CE22 416 via PE1 422, transport network 420, and PE2 424. Further, control channels 426 and 428 may be implemented between PE1 422 and PE2 424.

There are multiple ways an internet protocol (IP) network may carry traffic from a source to a destination. Multiprotocol Label Switching (MPLS) level 3 (L3) virtual private network (VPN) tunnels are one of the most common tunneling overlay technologies used to achieve the bridging between the RAN and the 5G core. FIG. 4 illustrates the data plane and control plane working in tandem to implement an overlay tunnel to carry traffic across a large geographic area. Hence to activate/deactivate or pause/resume a TS two transport mechanisms are needed: a tag token exchange control plane protocol (TTE); and a tag token inline data plane protocol (TTI).

A network service architecture may define a transport tunnel in which a service distribution point (SDP) acts as a logical way to direct traffic from one edge to another. The TSC will signal the SDPs to listen for its notifications and act as an enabler of the TS. The SDPs also will be responsible for initiating TTE.

Once a TS is configured, a TTE registration request is sent to all nodes responsible for a tunnel. As a control plane protocol, it is aware of topology of the network and how to tune the network to provide the RAN/Core notification For example, when the RAN sends a notification saying the traffic should pause, the TTE will be used to notify the SDN as well as embed a packet for all nodes the transport slice is associated with. All the edge nodes will not embed a TTI packet and propagate to ensure there is no data packet is flowing through the channel (see FIG. 9 and its description below).

TSC establishes the TS ADCP session with one or all of the following entities: RAN, AMF. On the event of Last UE Dial-Out or First UE Dial-In belonging to a particular Slice, the TS ADCP: TTE message will be triggered from the detected RAN scope to the TSC, also, if this happens to be an across the PLMN event, then the 5G Core: AMF will send the TS ADCP TTE message to the TSC. Based on at what scope the TS ADCP TTE message is received by TSC, either a particular RAN, or a set of RANs or the complete Domain through the AMF, then TSC will deactivate/(re)activate the needed IP Network resources to bring in the needed optimizations.

Modern day SDNs use telemetry to track resources of a network elements. Protocols like GRPC provide extensions that may be used to communicate TS-ADCP messages with nodes in the network. In most protocols, either network elements communicate with each other, or network elements communicate with the SDN controller. However, for TS-ADCP to work, it needs to synchronize with SDN and edge nodes simultaneously.

The SDN in this case includes the TSC that will initiate the connection to establish IP connectivity. Once a connection is established, the TSC exchange OPEN messages, which initializes the TSC session. Once session is successfully established, the SDN and NE exchanges the session parameters to be negotiated.

Figure 5:
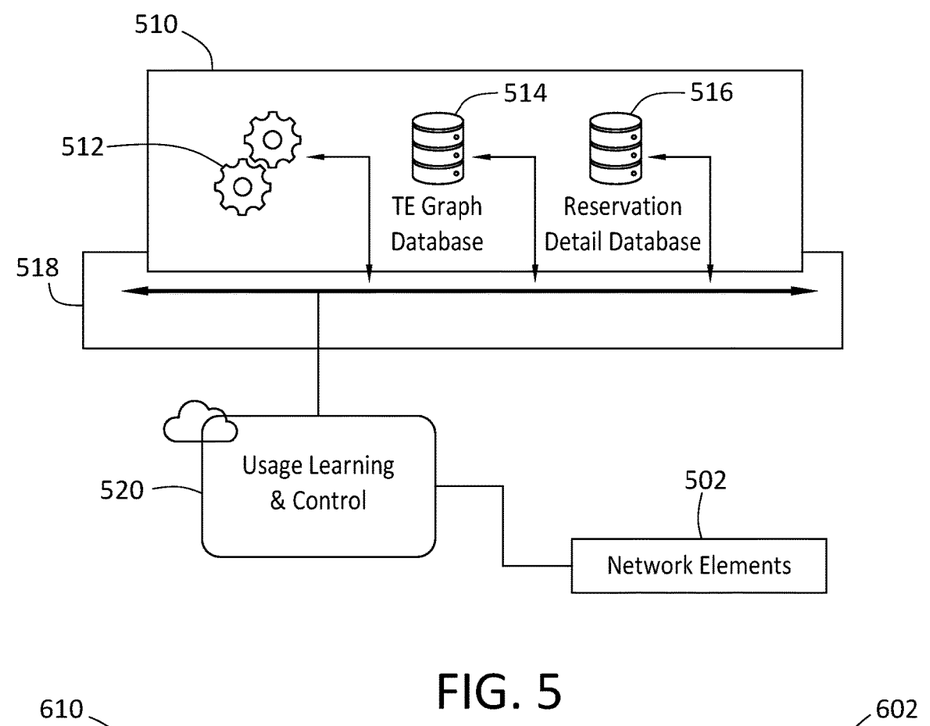
FIG. 5 illustrates a few elements of the TSC used to implement the TS-ADCP.

FIG. 5 illustrates a few elements of the TSC used to implement the TS-ADCP. The TSC 510 includes configuration parameters 512, transport element (TE) graph database 514, and reservation detail database 516. The configuration parameters 512 include the various configuration parameters that may be used to configure the TS based upon the application using the slice, user inputs, QoS requirements, etc. The TE graph database 514 includes a graph of the various TEs that might be used to implement the TS. This helps the TSC 510 to identify the specific TEs that may be used to implement the slice. The reservation detail database 516 includes information regarding the reservation of various network resources so that the configuration parameters 512 can negotiate for the resources needed for the TS to meet the QoS requirements of the TS. The mediation interface 518 interfaces with the usage learning and control 520 to help determine the network elements 502 and associated resources that may be used to implement the TS. The usage learning and control 520 provides information regarding the capacity of optical network elements and current usage.

Figure 6:
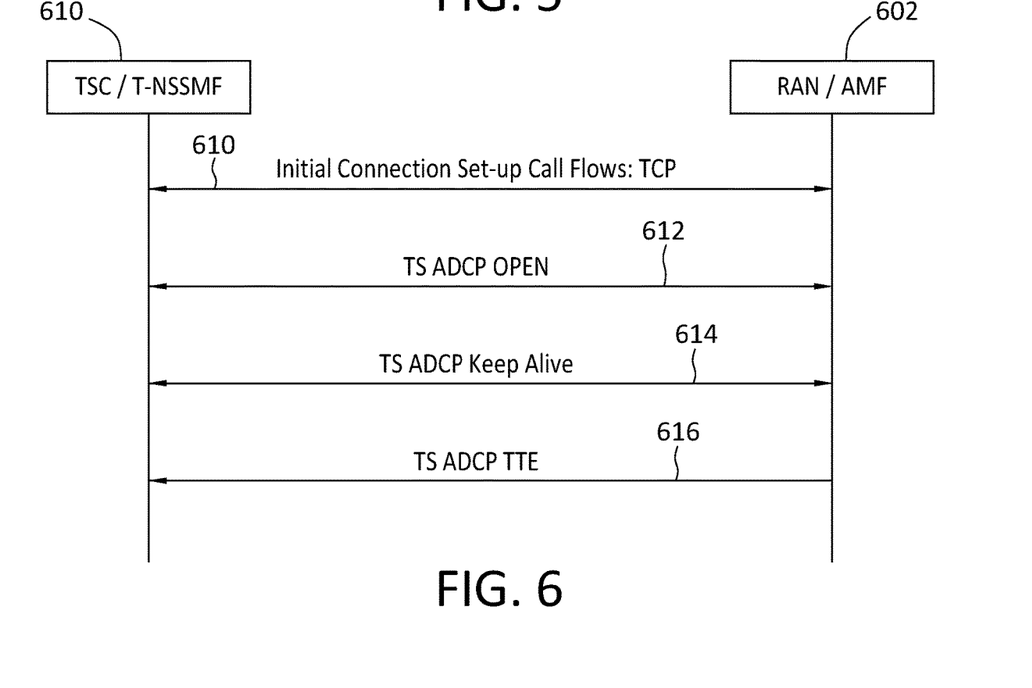
FIG. 6 illustrates a diagram of a TS-ADCP session initialization.

FIG. 6 illustrates a diagram of a TS-ADCP session initialization. The initialization is carried out between the TSC/T-NSSMF 610 and a network element 602 such as a RAN or AMF. The TSC/T-NSSMF 610 first sends sets up TCP initial connection set-up call flows 610 with the RAN/AMF 602. The RAN/AMF 602 exchanges TS-ADCP Open messages 612. The RAN/AMF 602 and the TSC/T-NSSMF 610 also exchange TS-ADCP Keep Alive messages 614. At this point the TS is available for use, and the RAN/AMF 602 may send a TS ADCP TTE message 616 to the TSC/T-NSSMF 610.

A few messages for use in the control plane and the data plane will now be described. The tag token exchange (TIE) message (tsc_adcp_tte) is a message used in the control plane. The message tsc_adcp_tte is sent from the RAN/CSR to the network slice subnet management function (NSSMF) layer where with the information that identifies the slice based event: First UE Dialed-In or Last UE Dialed-out. Based on the event: First UE Dialed-In, the NSSMF layer will activate the services created in the context of this slice or in case of event Last UE Dialed-out, deactivate the services crated for this slice.

The tag token inline (TTI) messages (tsc_adcp_tti) is a message used in the data plane. The RAN node may communicate the details of the slice event with this message to the CSR Node in the data plan. The CSR Node, later propagates the details in this message to the NSSMF layer through the tsc_adcp_tti message.

The following is an example data structures that may be used for tsc_adcp_tte and tsc_adcp_tti.

```
struct tsc_adcp_tte {
    struct s_nssai;
    uint8_t dial_in_dial_out_bitset; /* 0th Bit: First UE dialed-in
        1st Bit: Last UE dialed-out */
}
struct tsc_adcp_tti {
    struct s_nssai;
    uint8_t dial_in_dial_out_bitset; /* 0th Bit: First UE dialed-in
        1st Bit: Last UE dialed-out */
}
struct s_nssai {
    uint8_t sst; /* Slice Service Type */
    uint32_t sd; /* Slice Differentiator */
};
```

The dial_in_dial_out_bitset is a parameter that has one value when a first UE has dialed into the slice and the other value when the last UE has dialed out of the slice. This value can be used to indicate that charging for the slice should begin or stop. The data structure s_nssai defines sst which is the slice service type and sd which is the slice differentiator. SST refers to the expected TS behavior in terms of features and services. SD is an optional information that complements the slice/service type(s) to differentiate amongst multiple TSs of the same slice/service type.

Figure 7:
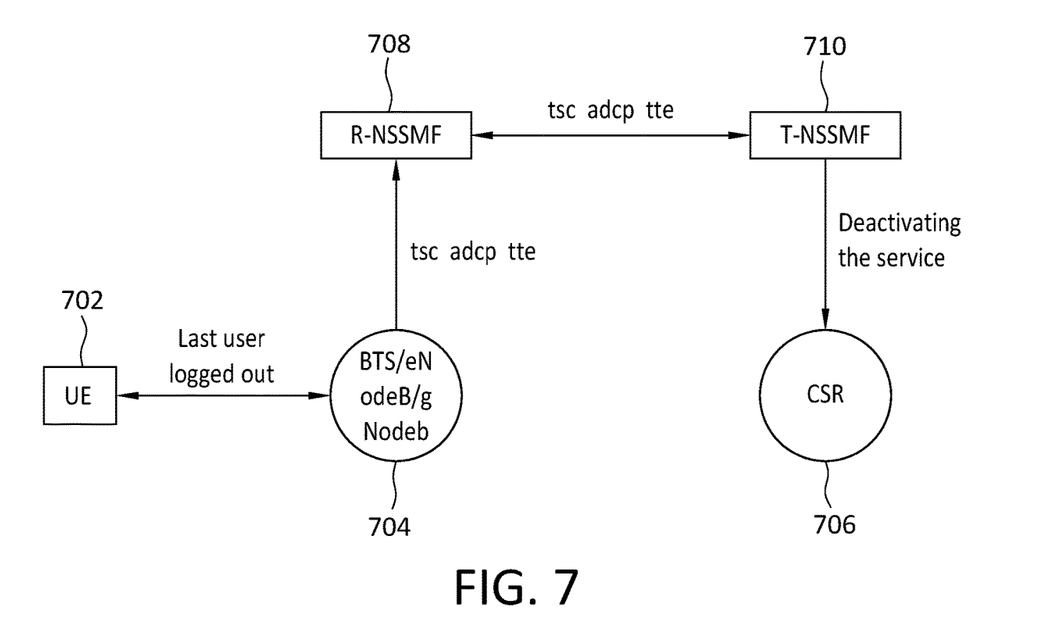
FIG. 7 illustrates a first scenario using the tsc_adcp_tte message to deactivate the TS service.

FIG. 7 illustrates a first scenario using the tsc_adcp_tte message to deactivate the TS service. The first scenario uses the control plane to transmit the tsc_adcp_tte message. The system includes UE 702, RAN 704, CSR 706, R-NSSMF 708, and T-NSSMF 710. The UE 702 communicates with the RAN 704. The RAN will receive an indication that the last user of the TS has logged out. The UE may provide the network slice selection assistance information NSSAI for network slice selection in a RRCSetUpComplete Call to the RAN Layer; as part of this the RTAN may determine these states. In response, the RAN 704 sends a tsc_adcp_tte message to the RAN NSSMF (R-NSSMF) 708 with the dial_in_dial_out_bitset bit indicating that the service is to be activated with the dial_in_dial_out_bitset bit indicating that the service is to be deactivated. The R-NSSMF 708 then forwards the tsc_adcp_tte message to the transport NSSMF (T-NSSMF) 710 associated with the CSR 706 that is part of the TS. The T-NSSMF 710 then deactivates the TR service on the CSR 706 by sending a deactivation message to the CSR 706.

Figure 8:
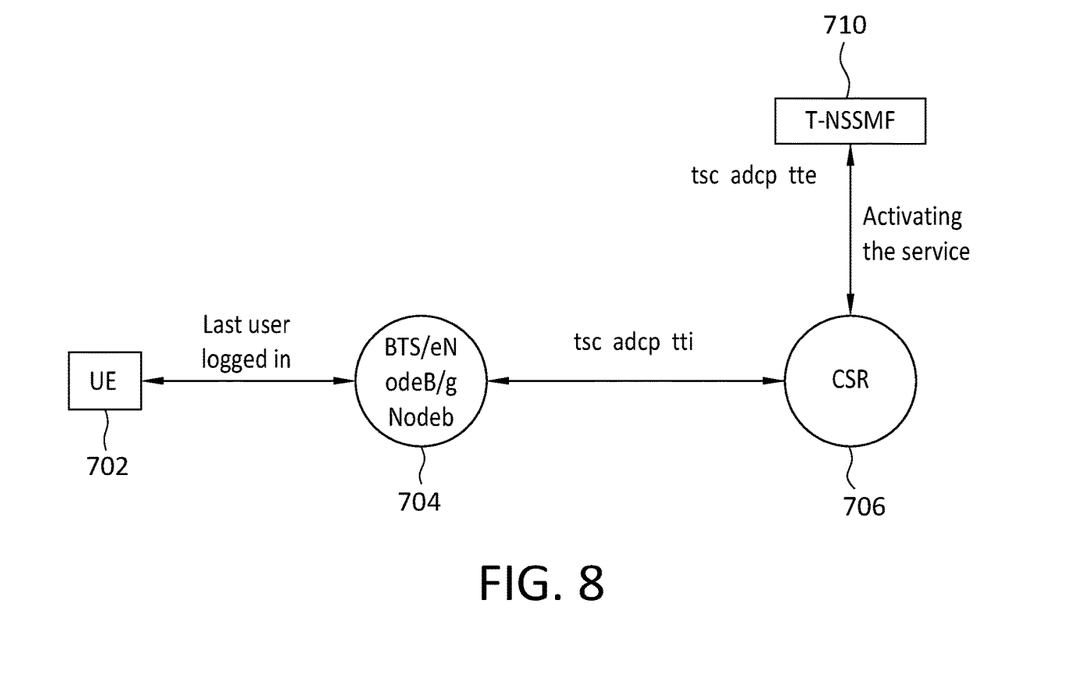
FIG. 8 illustrates a second scenario using the tsc_adcp_tte message activate the TS service.

FIG. 8 illustrates a second scenario using the tsc_adcp_tte message activate the TS service. The second scenario uses the data plane to transmit the tsc_adcp_tti message and the control plane with the tsc_adcp_tte message. The UE 702 communicates with the RAN 704. The RAN will receive an indication that the first user of the TS has logged in. As above, the UE may provide the network slice selection assistance information NSSAI for network slice selection in a RRCSetUpComplete Call to the RAN Layer; as part of this the RTAN may determine these states. In response, the RAN 704 sends a tsc_adcp_tti message to the CSR 706 that is part of the TS with the dial_in_dial_out_bitset bit indicating that the service is to be activated. The CSR 706 then sends a tsc_adcp_tte message based upon the tsc_adcp_tti message to the T-NSSMF 710 associated with the CSR 706. The CSR 706 then deactivates the TR service on the CSR 706.

Figure 9:
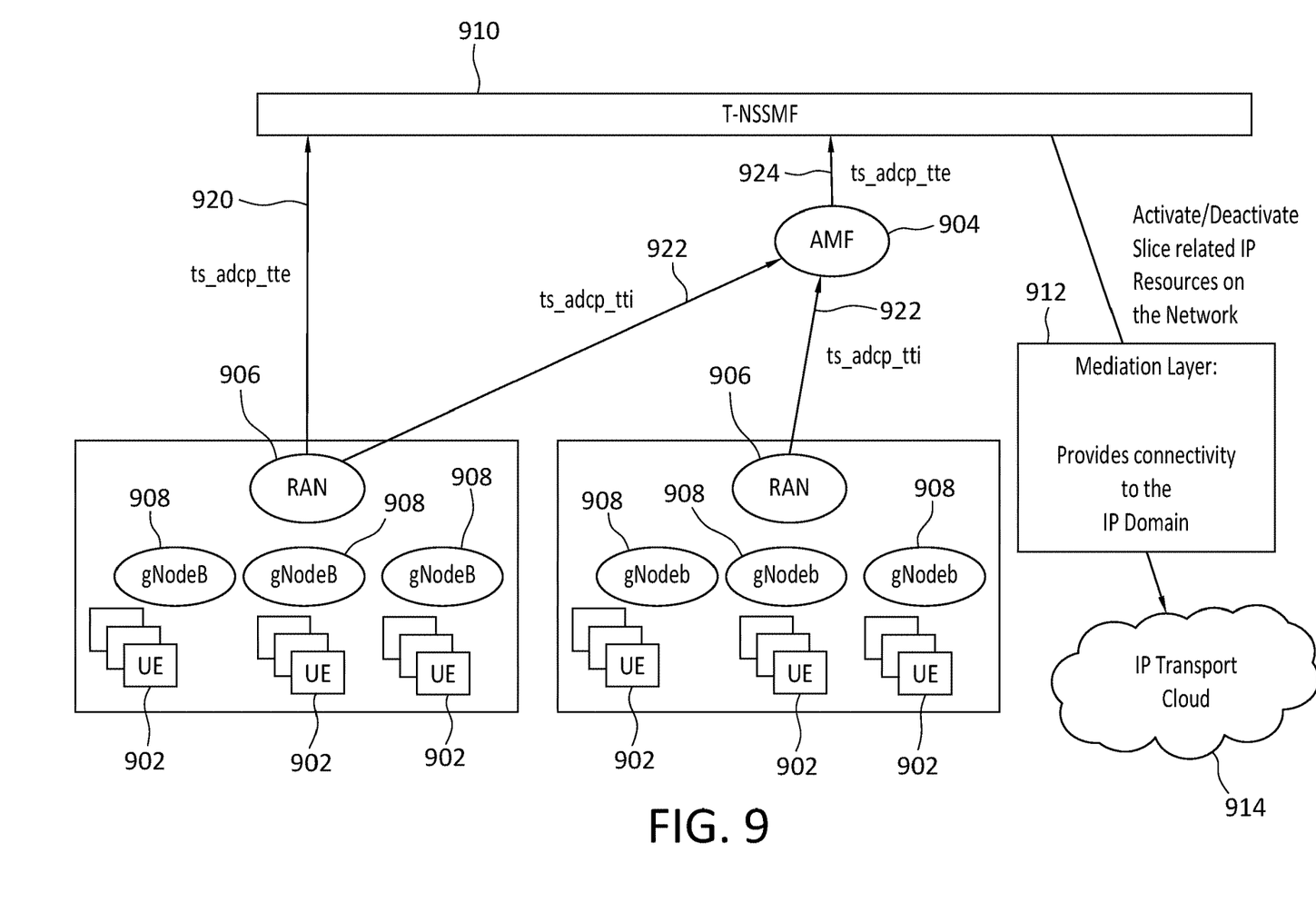
FIG. 9 illustrates the interaction between the T-NSSMF, AMF, and RAN.

FIG. 9 illustrates the interaction between the T-NSSMF, AMF, and RAN. The RAN 906 my interact Ues 902 through gNodeBs 908. The RAN 906 may send a ts_adcp_tte message 920 directly to the T-NSSMF 910. Alternatively, the RAN 906 may send a ts_adcp_tti message 922 to the AMF 904, and then the AMF 904 sends at ts_adcp_tte message 924 to the T-NSSMF 910. The ts_adcp_tte message 920 received by the T-NSSMF 910 may indicate by the dial_in_dial_out_bitset whether to start or stop the transport slice. The T-NSSMF 910 may send a message via a mediation layer 912 to the IP transport cloud 914 to start or stop the transport slice.

Figure 10:
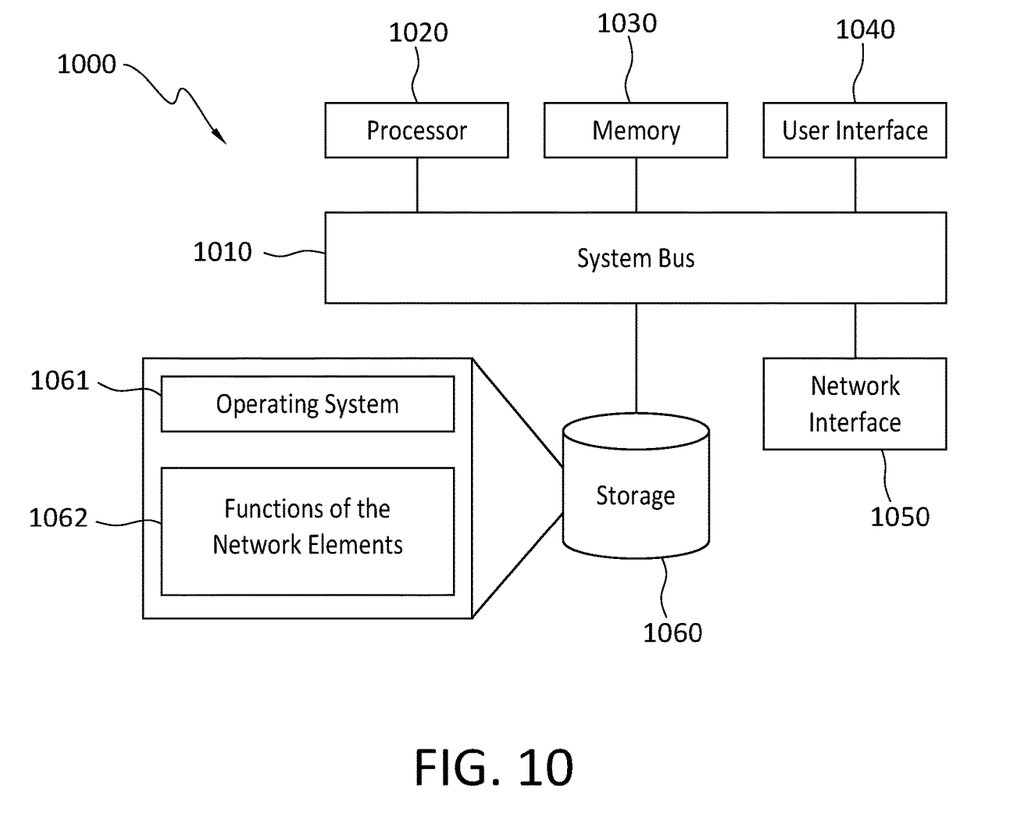
FIG. 10 illustrates an exemplary hardware diagram for implementing any of the network elements in the 5G network.

FIG. 10 illustrates an exemplary hardware diagram 1000 for implementing any of the network elements in the 5G network described herein including at least the UE, RAN, 5G core, gNodeB, Ng-eNodeB, etc. As shown, the device 1000 includes a processor 1020, memory 1030, user interface 1040, network interface 1050, and storage 1060 interconnected via one or more system buses 1010. It will be understood that FIG. 10 constitutes, in some respects, an abstraction and that the actual organization of the components of the device 1000 may be more complex than illustrated.

The processor 1020 may be any hardware device capable of executing instructions stored in memory 1030 or storage 1060 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 1030 may include various memories such as, for example L1, L2, or L3 cache or system memory. As such, the memory 1030 may include static random-access memory (SRAM), dynamic RAM (DRAM), flash memory, read only memory (ROM), or other similar memory devices.

The user interface 1040 may include one or more devices for enabling communication with a user such as an administrator. For example, the user interface 1040 may include a display, a touch interface, a mouse, and/or a keyboard for receiving user commands. In some embodiments, the user interface 1040 may include a command line interface or graphical user interface that may be presented to a remote terminal via the network interface 1050.

The network interface 1050 may include one or more devices for enabling communication with other hardware devices. For example, the network interface 1050 may include a network interface card (NIC) configured to communicate according to the Ethernet protocol or other communications protocols, including wireless protocols. Additionally, the network interface 1050 may implement a TCP/IP stack for communication according to the TCP/IP protocols. Various alternative or additional hardware or configurations for the network interface 1050 will be apparent.

The storage 1060 may include one or more machine-readable storage media such as read-only memory (ROM), random-access memory (RAM), magnetic disk storage media, optical storage media, flash-memory devices, or similar storage media. In various embodiments, the storage 1060 may store instructions for execution by the processor 1020 or data upon with the processor 1020 may operate. For example, the storage 1060 may store a base operating system 1061 for controlling various basic operations of the hardware 1000. Storage 1062 includes instructions for carrying out the various functions of the various network elements described herein, including at least the UE, RAN, 5G core, gNodeB, Ng-eNodeB, etc.

It will be apparent that various information described as stored in the storage 1060 may be additionally or alternatively stored in the memory 1030. In this respect, the memory 1030 may also be considered to constitute a "storage device" and the storage 1060 may be considered a "memory." Various other arrangements will be apparent. Further, the memory 1030 and storage 1060 may both be considered to be "non-transitory machine-readable media." As used herein, the term "non-transitory" will be understood to exclude transitory signals but to include all forms of storage, including both volatile and non-volatile memories.

The system bus 1010 allows communication between the processor 1020, memory 1030, user interface 1040, storage 1060, and network interface 1050.

While the host device 1000 is shown as including one of each described component, the various components may be duplicated in various embodiments. For example, the processor 1020 may include multiple microprocessors that are configured to independently execute the methods described herein or are configured to perform steps or subroutines of the methods described herein such that the multiple processors cooperate to achieve the functionality described herein. Further, where the device 1000 is implemented in a cloud computing system, the various hardware components may belong to separate physical systems. For example, the processor 1020 may include a first processor in a first server and a second processor in a second server.

In accordance with one or more of the aforementioned embodiments, the methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the operations of the system and method embodiments described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is apparent to those skilled in the art, variations and modifications can be affected while remaining within the spirit and scope of the invention. The embodiments may be combined to form additional embodiments. Accordingly, the foregoing disclosure, description, and figures are for illustrative purposes only and do not in any way limit the invention, which is defined by the claims. The embodiments may be combined to form additional embodiments.

We claim:

1. A transport slice controller, comprising:
   at least one processor; and
   at least one memory storing instructions, that when executed by the at least one processor, cause the apparatus at least to:
   initialize a transport slice activation and deactivation protocol (TS-ADCP) session for a transport slice of a telecommunications network;
   determine an indication of a login status of users of the transport slice, wherein the login status includes an indication that a first user has logged in to the transport slice or that a last user has logged out of the transport slice; and
   sending a message with the indication of the login status of users to a network element to indicate that the transport slice should be activated or deactivated.

2. The transport slice controller of claim 1, wherein sending a message with the indication of the login status of users to a network element includes sending a control plane message to a network slice subnet management function.

3. The transport slice controller of claim 1, wherein the network element is a cell site router.

4. The transport slice controller of claim 1, wherein sending a message with the indication of the login status of users to a network element includes initiating via a radio access network a data plane message to the network element.

5. The transport slice controller of claim 1, wherein sending a message with the indication of the login status of users is a single bit and wherein the message includes a slice service type field and a slice differentiator field.

6. A radio access network, comprising:
   at least one processor; and
   at least one memory storing instructions, that when executed by the at least one processor, cause the apparatus at least to:
   receive an indication of a login status of users of a transport slice of a telecommunications network, wherein the login status includes an indication that a first user has logged in to the transport slice or that a last user has logged out of the transport slice; and
   sending a message with the indication of the login status of users to a network element to indicate that the transport slice should be activated or deactivated.

7. The radio access network of claim 6, wherein sending a message with the indication of the login status of users to a network element includes sending a control plane message to a network slice subnet management function.

8. The radio access network of claim 6, wherein the network element is a cell site router.

9. The radio access network of claim 6, wherein sending a message with the indication of the login status of users to a network element includes sending a data plane message to the network element.

10. The radio access network of claim 6, wherein sending a message with the indication of the login status of users is a single bit and wherein the message includes a slice service type field and a slice differentiator field.

11. A network element, comprising:

at least one processor; and at least one memory storing instructions, that when executed by the at least one processor, cause the apparatus at least to:

initialize a transport slice activation and deactivation protocol (TS-ADCP) session in the network element for a transport slice of a telecommunications network;

receiving a message with an indication of a login status of users to indicate that the transport slice should be activated or deactivated; and changing the status of the transport slice at the network element based on the message with the indication of the login status of users.

12. The network element of claim 11, wherein receiving a message with the indication of the login status of users to includes receiving a control plane message.

13. The network element of claim 11, wherein the network element is a cell site router.

14. The network element of claim 11, wherein receiving a message with the indication of the login status of users to a network element includes receiving a data plane message.

15. The network element of claim 11, wherein receiving a message with the indication of the login status of users is single bit and wherein the message includes a slice service type field and a slice differentiator field.

\* \* \* \* \*